US012620268B2

(12) United States Patent
Wong et al.

(10) Patent No.: US 12,620,268 B2
(45) Date of Patent: May 5, 2026

(54) SYSTEMS AND METHODS FOR CONTACTLESS ENTRIES AND PAYMENTS USING MOBILE WALLETS AND ULTRA-WIDE BAND COMMUNICATIONS

(71) Applicant: Samsung Electronics Company, Ltd., Suwon si (KR)

(72) Inventors: Erick Wong, Vancouver (CA); Alexi Georgiev Jordanov, Westminster (CA)

(73) Assignee: Samsung Electronics Company, Ltd., Suwon City (KR)

( * ) Notice: Subject to any disclaimer, the term of this patent is extended or adjusted under 35 U.S.C. 154(b) by 485 days.

(21) Appl. No.: 18/300,154

(22) Filed: Apr. 13, 2023

(65) Prior Publication Data

US 2024/0346855 A1 Oct. 17, 2024

(51) Int. Cl.
| | |
|---|---|
| *G07B 15/00* | (2011.01) |
| *G06Q 20/32* | (2012.01) |
| *G06Q 20/38* | (2012.01) |
| *G06Q 20/40* | (2012.01) |

(52) U.S. Cl.
CPC ......... *G07B 15/00* (2013.01); *G06Q 20/3224* (2013.01); *G06Q 20/327* (2013.01); *G06Q 20/3821* (2013.01); *G06Q 20/3823* (2013.01); *G06Q 20/403* (2013.01); *G06Q 2240/00* (2013.01)

(58) Field of Classification Search
CPC .. G07B 15/00; G06Q 20/3224; G06Q 20/327; G06Q 2240/00
See application file for complete search history.

(56) References Cited

U.S. PATENT DOCUMENTS

| | | | | |
|---|---|---|---|---|
| 10,438,029 | B2 * | 10/2019 | Al-Kadi ................... | H04B 5/77 |
| 2019/0098499 | A1 * | 3/2019 | Lerch ................. | G06Q 20/3821 |
| 2020/0082370 | A1 * | 3/2020 | Yang ...................... | G06Q 20/20 |
| 2021/0224784 | A1 * | 7/2021 | Li ....................... | H04W 12/033 |

(Continued)

OTHER PUBLICATIONS

FiRa Consortium, Unleashing the Potential of UWB: Regulatory Considerations, Aug. 2022, FiRa Consortium, https:// www. firaconsortium.org/resource-hub/white-papers (Year: 2022).*

Primary Examiner — John W Hayes
Assistant Examiner — Taylor S Rak
(74) *Attorney, Agent, or Firm* — Baker Botts L.L.P.

(57) ABSTRACT

In one embodiment, a method includes sending, via an ultra-wide band (UWB) communication protocol from a first application associated with a first UWB-enabled device to a second application associated with a second UWB-enabled device, (1) location information indicating a location of the first UWB-enabled device with respect to the second UWB-enabled device and (2) balance information indicating an available monetary balance on the first UWB-enabled device. The second application associated with the second UWB-enabled device may use the location and balance information to perform an action with respect to the second UWB-enabled device. A payment cryptogram may be generated based on event information relating to the action performed with respect to the second UWB-enabled device and unique device characteristics associated with the first UWB-enabled device. The payment cryptogram may be used for securely authorizing a payment transaction relating to the action performed with respect to the second UWB-enabled device.

20 Claims, 9 Drawing Sheets

(56) References Cited

U.S. PATENT DOCUMENTS

| | | | |
|---|---|---|---|
| 2021/0409896 A1* | 12/2021 | Ahn | H04W 88/06 |
| 2023/0260330 A1* | 8/2023 | Mango | G06Q 20/3224 |
| | | | 705/13 |

* cited by examiner

FIG. 5

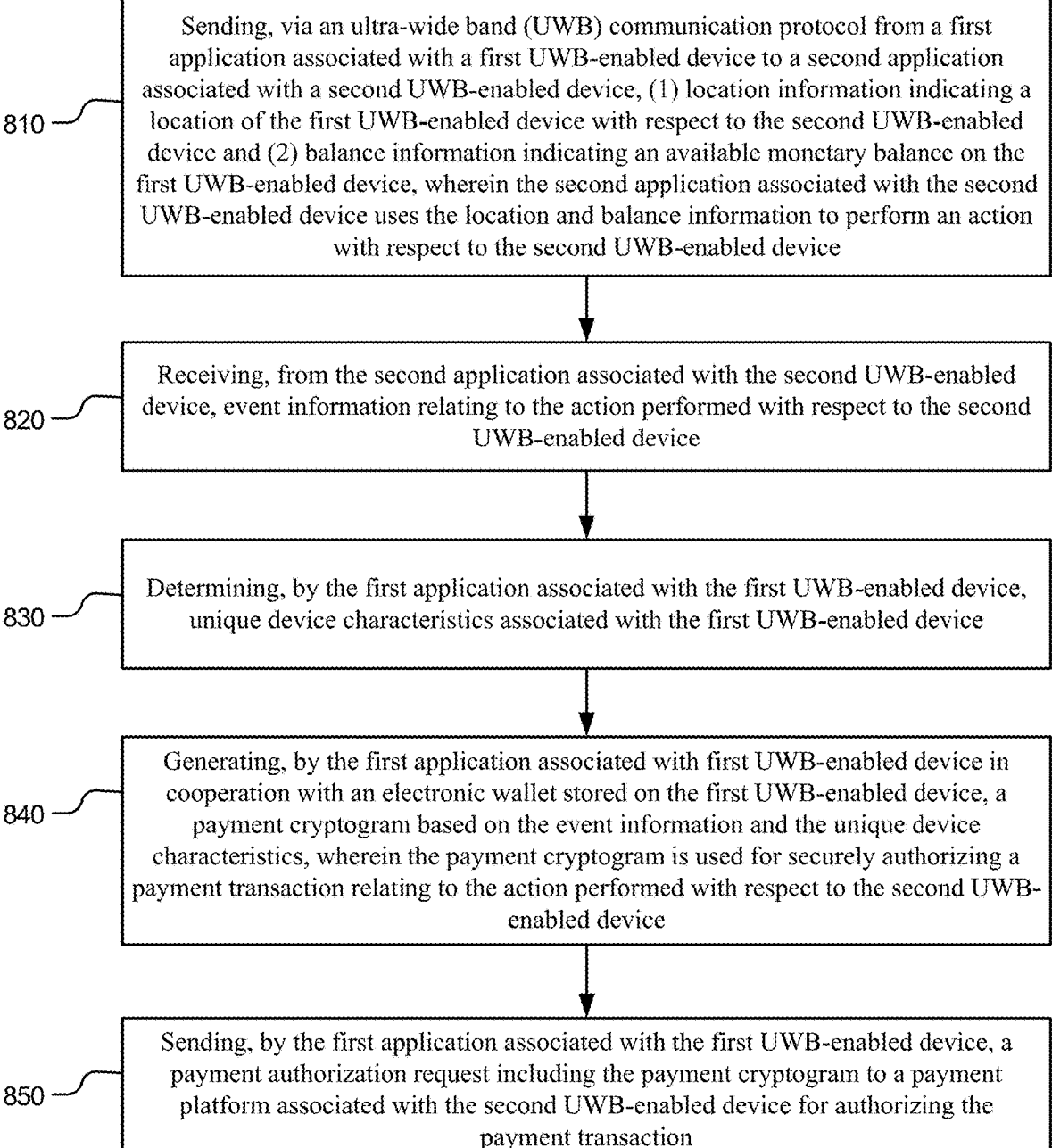

800

810 — Sending, via an ultra-wide band (UWB) communication protocol from a first application associated with a first UWB-enabled device to a second application associated with a second UWB-enabled device, (1) location information indicating a location of the first UWB-enabled device with respect to the second UWB-enabled device and (2) balance information indicating an available monetary balance on the first UWB-enabled device, wherein the second application associated with the second UWB-enabled device uses the location and balance information to perform an action with respect to the second UWB-enabled device 820 — Receiving, from the second application associated with the second UWB-enabled device, event information relating to the action performed with respect to the second UWB-enabled device 830 — Determining, by the first application associated with the first UWB-enabled device, unique device characteristics associated with the first UWB-enabled device 840 — Generating, by the first application associated with first UWB-enabled device in cooperation with an electronic wallet stored on the first UWB-enabled device, a payment cryptogram based on the event information and the unique device characteristics, wherein the payment cryptogram is used for securely authorizing a payment transaction relating to the action performed with respect to the second UWB-enabled device 850 — Sending, by the first application associated with the first UWB-enabled device, a payment authorization request including the payment cryptogram to a payment platform associated with the second UWB-enabled device for authorizing the payment transaction

FIG. 8

SYSTEMS AND METHODS FOR CONTACTLESS ENTRIES AND PAYMENTS USING MOBILE WALLETS AND ULTRA-WIDE BAND COMMUNICATIONS

TECHNICAL FIELD

This disclosure relates generally to database and file management within network environments, and in particular relates to enabling handsfree or contactless payments and user entries through fare gates at transit stations using mobile wallets and ultra-wideband communications.

BACKGROUND

Generally, when people travel from one place to another through various public transit mediums or mode of communication (e.g., subways, flights, trains, cars, ferries, etc.), they have to pass through some sort of payment mechanism to pay for their transit fares. As an example and not by way of limitation, when a rider is taking a train, they have to pass through a transit terminal, such as a fare gate. When passing through the fare gate, the rider has to pay for the fare in order to use a public transit medium, such as the train. Conventional or existing payment methods for paying for the fare in such a scenario generally require riders to purchase tickets in advance or purchasing the tickets in real-time from an attendant, require attendants to be physically present at transit terminals or fare gates, require riders to purchase transit passes and reload these passes at period time intervals with amounts sufficient to suffice for the transit fares, require riders to tap payment cards and/or transit passes at card readers located at the transit stations or terminals, require riders to tap or scan their mobile devices storing payment cards at the card readers in order to access fare gates, etc. All these conventional or existing payment methods adds to an inefficient and burdensome transit experience for the riders. As such, there is a need for an improved solution or technique for riders or consumers to pay for transit fares and access the transit terminals that is more natural, less cumbersome, easy to use, reduces bottlenecks, and improves overall experience and safety of the consumers at transit stations, terminals, and/or fare gates.

BRIEF DESCRIPTION OF THE DRAWINGS

FIG. 5 illustrates an example environment associated with a payment cryptogram generation process.

FIG. 8 illustrates a flow diagram of an example method for performing an action with respect to a UWB-enabled device and generating a payment cryptogram for authorizing a payment transaction relating to the action, in accordance with the presently disclosed embodiments.

DESCRIPTION OF EXAMPLE EMBODIMENTS

Figure 1:
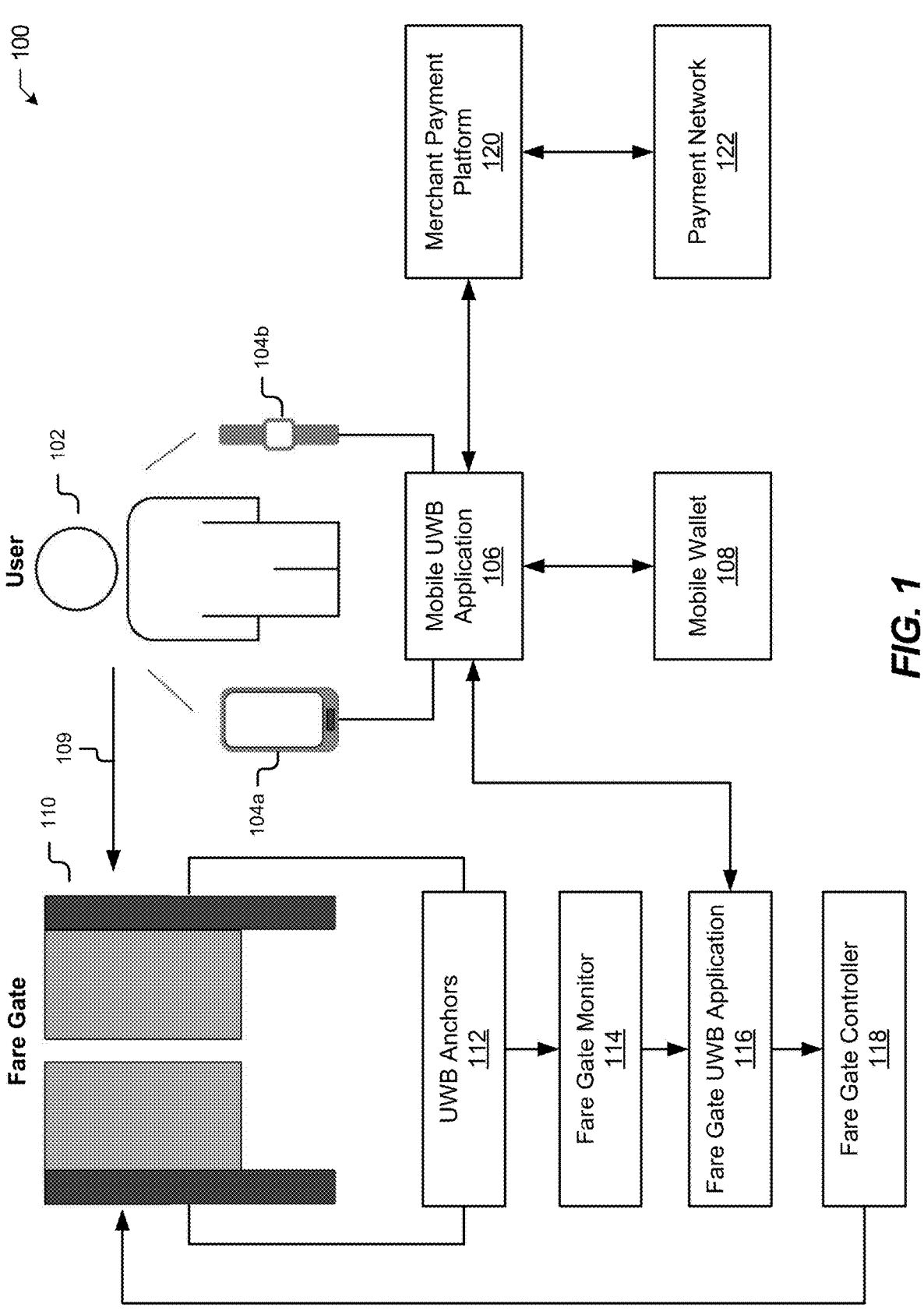
FIG. 1 illustrates a high-level overview of components associated with an improved transit fare gate ecosystem discussed herein.

Generally, when people travel from one place to another through various public transit mediums or mode of communication (e.g., subways, flights, trains, cars, ferries, etc.), they have to pass through some sort of payment mechanism to pay for their transit fares. As an example and not by way of limitation, when a person is taking a subway, train, or a metro, they have to pass through a transit terminal, such as a fare gate. When passing through the fare gate, the person has to pay for the fare in order to use a public transit medium, such as a train. Conventional or existing payment methods for paying for the fare in such a scenario include manual methods, closed loop systems, and open loop systems. Each of these payment methods, however, have certain limitations as discussed below.

Manual methods for making payments when passing through fare gates may include paper tickets and fare tokens. However, paper tickets and fare tokens have issues of durability and performance at fare gates, as well as the requirement for a user to periodically purchase tickets or tokens from an attendant. In this scenario, a monthly pass is generally required, and the attendant is required to visually inspect the pass to the allow entry of the user.

Closed loop systems typically involve the use of a transit agency issuing magnetic strip paper or plastic cards or radio frequency (RF) technology cards that could store value as well as monthly passes. While these advancements, particularly the RF technology cards, made the transit fare gate access simpler and faster by not requiring attendant, it still requires riders to purchase value periodically.

Open loop systems are generally coincident with the launch and pervasiveness of mobile wallets (e.g., SAMSUNG PAY). Users or riders can use these mobile wallets to electronically pay for their fares. Mobile wallets store payment cards (e.g., credit cards) electronically on their mobile electronic devices, such as smartphones, smartwatches, tablets, etc. Some of the transit agencies have begun to adapt open loop payment methods to allow their riders to use their existing payment cards, whether in plastic card or on their phone, to access a fare gate. These methods are similar to the use of the RF-technology cards in the closed loop systems, but they require the rider or consumer to tap their device or a plastic card at the fare gate. The open loop systems effectively give consumers more choice in how they chose to pay for a transit ride, expedited the transit experience for casual riders, and give the transit agencies a better ability to serve their customer base effectively and efficiently. Although, the open loop payment systems or methods give more flexibility to consumers to pay for their fares (e.g., pay for a fare electronically though an electronic wallet), however, they still require the consumers to tap their devices storing the payment cards or plastic cards in order to access fare gates that again adds to an inefficient and burdensome experience for the consumers.

As such, there is a need for an improved solution or technique for consumers to pay for transit fares that is more natural, less cumbersome, easy to use, reduces bottlenecks, and improves overall experience and safety of the consumers at transit fare gates. Particular embodiments discussed herein relate to an improved transit fare gate ecosystem and a payment mechanism for consumers to make contactless payments and accesses at fare gates or transit terminals. The improved transit fare gate ecosystem and the payment mechanism is built around the prevalence of multi-payment scheme mobile wallets (e.g., SAMSUNG PAY) and the relatively recent inclusion of ultra-wide band (UWB) technologies in consumer mobile communication devices, such as smartphones, smartwatches, tablets, etc. The payment mechanism or method discussed herein is an improvement over current methods for fare gate systems, such as those in common use in subway and train systems worldwide. For instance, the improved transit fare gate ecosystem and payment method removes the need for a consumer or user to present their mobile communication device (enabled with a mobile wallet) or legacy plastic contactless card at a fare gate reader. For high volume fare gate systems, particularly during busy periods of the day, the improved transit fare gate ecosystem and payment method discussed herein will make transit use for riders a handsfree experience that is more natural, and for the transit operator, reduced bottlenecks and improved customer safety at the fare gate. Furthermore, the inclusion of high precision technologies (e.g., UWB and Wi-Fi 6) on mobile communication devices alongside the availability of mobile wallet solutions open the doors for significant improvements in the consumer experience and operational efficiency for transit system operators. The improvements are amongst the consumer to fare gate experience as well as reduced bottlenecks and improved safety at transit fare gates.

FIG. 1 illustrates a high-level overview 100 of components associated with an improved transit fare gate ecosystem discussed herein. As illustrated, the components may include, for example and without limitation, mobile communication devices 104a and 104b (also collectively and/or individually referred to herein as 104), a mobile UWB application 106, a mobile wallet 108, a fare gate 110, one or more UWB anchors 112, a fare gate monitor 114, a fare gate UWB application 116, a fare gate controller 118, a merchant payment platform 120, and a payment network 122. It should be noted that the transit fare gate ecosystem is not limited to these components shown in FIG. 1 and a variety of other types of or additional components are possible and within the scope of the present disclosure. By way of an example, as depicted, the mobile communication device 104a is a mobile electronic device (e.g., a smartphone) and the mobile communication device 104b is a wearable device (e.g., smartwatch), but there may be other types of mobile communication devices, such as a tablet, a laptop computer, an artificial reality headset, etc. As another example, there may be multiple users and multiple fare gates as part of the transit fare ecosystem. Each of the components is now discussed in detail below.

The mobile communication device 104 (also interchangeably herein referred to sometimes as mobile electronic device 104, an electronic device 104, or mobile device 104) may include any communication or a personal electronic device. In particular embodiments, the mobile electronic device 104 may include, for example, a mobile phone electronic device or a smartphone 104a, a smartwatch 104b, a tablet computer electronic device (not shown), a laptop computer electronic device (not shown), and so forth. A user 102 may be carrying or wearing the mobile electronic device 104. For example, the user 102 may be carrying the smartphone 104a in their pocket. As another example, the user 102 may be wearing the smartphone 104b on their wrist.

The mobile electronic device 104 may be any device that supports a mobile wallet and contains UWB radio support. In particular embodiments, the mobile electronic device 104 may be an UWB-enabled device that can communicate with other UWB-enabled devices over a UWB communication channel or protocol. The mobile electronic device 104, including device 104a or device 104b, may include, among other components, a mobile UWB application 106 and a mobile wallet 108. The mobile UWB application 106 may be a software application resident on the mobile electronic device that runs persistently as a system level application without any need for user intervention. The mobile UWB application 106 may be configured to communicate (e.g., send and receive data) with another UWB application of a UWB-enabled device over an UWB communication channel. For instance, the mobile UWB application 106 may communicate with a fare gate UWB application 116 associated with a transit provider or transit terminal (e.g., fare gate) to exchange data relating to the mobile electronic device 104 and the fare gate 110. The mobile UWB application 106 may also be configured to communicate with a merchant payment platform 120 to authorize and/or clear a particular payment for user's fare entry through a fare gate 110.

The mobile wallet 108 may include an electronic payment mechanism stored on the mobile electronic device 104 to electronically make payments to merchants or third-party service providers (e.g., transit providers) for their services. For instance, the mobile wallet 108 may store various payments cards (e.g., credit cards, debit cards, etc.) and the user 102 may choose a default payment card to make payment to a merchant. By way of an example and without limitation, the user 102 may use the mobile wallet 108 to make payment to a transit provider associated with the fare gate 110 so that the user 102 may enter through the fare gate 110 and use a transit medium, such as a train.

The user 102 carrying the UWB-enabled mobile electronic device 104a or 104b may enter through the fare gate 110 or be located in a close proximity of the fare gate 110, as indicated by reference numeral 109. The fare gate 110 may include one or more UWB anchors 112 that enables the fare gate 110 to be also an UWB-enabled device, such that it may be detected by other UWB-enabled devices (e.g., mobile electronic devices 104a or 104b) for communication. For instance, the one or more UWB anchors 112 may be installed on the fare gate 110 such that the fare gate 110 also becomes a UWB-enabled device, be detected by other UWB-enabled devices (e.g., mobile electronic devices 104), and/or controlled by other component(s) of the transit fare gate ecosystem, such as fare gate controller 118.

The fare gate monitor 114 may be configured to detect presence or location of an UWB-enabled device at or around the fare gate 110 and report this location information to the fare gate UWB application 116. In particular embodiments, the fare gate monitor 114 may be configured to monitor possible passages by users (e.g., user 102) through fare gates without breaking stride. More specifically, the fare gate monitor 114 may monitor, using UWB anchor hardware situated around each fare gate, the approaches of consumers to particular fare gates. The fare gate monitor 114 may detect the presence of an UWB-enabled device (e.g., mobile electronic device 104a or 104b) via the one or more UWB anchors 112 that may be installed on the fare gate 110. For instance, the user 102 carrying the UWB-enabled mobile electronic device 104 may approach the fare gate 110 and enters in a monitored zone that may be located in proximity to the fare gate 110, as shown for example in FIG. 3. The UWB anchors 112 installed on the fare gate 110 may identify the user carrying the UWB-enabled mobile electronic device 104 in the monitored zone (e.g., at or in close proximity of the gate 110) based on UWB signals or radio waves exchanged between the fare gate 110 and the mobile electronic device 104, and report this identification to the fare gate monitor 114, which may then pass this information to the fare gate UWB application 116 for it to perform subsequent operations thereon.

The fare gate UWB application 116 may be a software application that is integrated with a fare gate controller 118 and which communicates over UWB to the mobile UWB application 106 on the mobile electronic device 104. For instance, responsive to receiving a notification or an indication from the fare gate monitor 114 that the user 102 carrying the UWB-enabled mobile electronic device 104 is at or nearby the fare gate 110, the mobile UWB application 106 may send (1) location information indicating a location of the mobile electronic device 104 and (2) balance information (e.g., available monetary balance, cash balance) associated with the mobile wallet 108 to the fare gate UWB application 116. The fare gate UWB application 116 may verify the location and balance information received from the mobile UWB application 106 and trigger the fare gate controller 118 to perform an action with respect to the fare gate 110. For instance, if the fare gate UWB application 116 determines that the location and balance information satisfy certain criteria (e.g., the user 102 carrying the mobile electronic device 104 is actually located in the monitored zone at the fare gate 110 and has sufficient balance in his mobile wallet 108 to suffice for the fare), then the fare gate UWB application 116 sends a trigger to the fare gate controller 118 to open the fare gate 110 for the user 102 to pass.

The fare gate controller 118 may be configured to perform an action with respect to the fare gate 110. For instance, based on the instructions received from the fare gate UWB application 116, the fare gate controller 118 may open or close the fare gate 110.

In addition to sending the instructions or trigger to the fare gate controller 118 to open the fare gate 110, the fare gate UWB application 116 may send fare gate event information including, for example and without limitation, station identifier (Station ID) identifying a station at which the fare gate 110 is located, gate identifier (Gate ID) identifying the fare gate 110 that the user 102 tried to access, timestamp indicating a time at which the user tried to access the fare gate 110, and other information to the mobile UWB application 106. The mobile UWB application 106 may use this fare gate event information received from the fare gate UWB application 116 to generate a payment cryptogram for payment clearance and authorization. For instance, the mobile UWB application 106 may send a request to the mobile wallet 108 to generate a secured payment cryptogram. When sending the request to generate the cryptogram, the mobile UWB application 106 may send the fare gate event information received from the fare gate UWB application 116 and unique device characteristics associated with the mobile electronic device 104. The unique device characteristics may include, for example and without limitation, operating system running on the device, unique device identifier, an international mobile equipment identity (IMEI) number, user identifier identifying the user associated with the mobile electronic device 104, etc.

A particular component of the mobile wallet 108 may be configured to generate a UWB payment network cryptogram (also interchangeably herein referred to simply as a cryptogram) based on the request received from the mobile UWB application 106. The cryptogram may be a cryptographically generated value unique to the proposed payment method discussed herein that uses the cryptogram generating capability of the mobile wallet 108. When generating the cryptogram, the mobile wallet 108 may use a unique cryptographic key provisioned for the particular payment card that is chosen by the user 102 as a default payment mechanism when making payments to other users or merchants through the mobile wallet 108. Detailed description with respect to generating the cryptogram is shown and discussed in reference to at least FIGS. 4 and 5.

The mobile UWB application 106 may receive the generated cryptogram from the mobile wallet 108. The mobile UWB application 106 may be further configured to communicate with a transit provider merchant payment platform 120 to authorize and clear a fare payment associated with the fare gate 110. For instance, when the user 102 tries to pass through the fare gate 110, a default payment card associated with the mobile wallet 108 is charged for the fare payment. A pending charge corresponding to the fare payment may be put on the default payment card. The pending charge may be subject to clearance and authorization. When clearing and/or authorizing a payment for a fare gate event (e.g., user tried to pass through the fare gate 110), the mobile UWB application 106 may send a payment authorization message along with the cryptogram received from the mobile wallet 108 to the merchant payment platform 120.

The merchant payment platform 120 may be situated as a cloud-based or server-based system and may be configured to authorize and/or clear a payment for a fare gate event. In particular embodiments, the merchant payment platform 120 may be associated with a transit provider or system and is configured to authorize and clear payments for fare gate events occurred at the transit provider. The merchant payment platform 120 may work in the background with the payment network 122 to authorize the payment. The merchant payment platform 120 may receive the payment authorization message and the cryptogram including payment details from the mobile UWB application 106. The merchant payment platform 120 may send the same or a modified payment authorization message along with the cryptogram to the payment network 122 for payment authorization.

The payment network 122 may be a financial institution providing financial-related services to various users, including the user 102. For example, the payment network 122 may be a bank or a card issuer company that has provided a debit card, a credit card, a checking account, a saving account, etc. to the user 102 for making payments and performing other financial activities. The payment network 122 may be configured to authorize a particular payment authorization request received from the merchant payment platform 120. The payment authorization request may include the payment authorization message and the cryptogram. Responsive to receiving the payment authorization request from the merchant payment platform 120, the payment network 122 may verify the payment authorization message and the cryptogram included in the payment authorization request and approve/decline the payment authorization. The payment network 122 may send results of its verification and payment authorization back to the merchant payment platform 120, which further send the results back to the mobile UWB application 106. Detailed description with respect to verification and payment authorization is shown and discussed in reference to at least FIG. 4.

The mobile UWB application 106 may be further config- ured to communicate results of the payment authorization discussed herein to the fare gate UWB application 116 over the UWB channel. For instance, the mobile UWB applica- tion 106 may notify the fare gate UWB application 116 whether the payment for the fare gate event is completed or failed. The fare gate UWB application 116 may perform an action based on the results of the payment authorization. For instance, if the payment authorization is failed, then the fare gate UWB application 116 may instruct the fare gate con- troller 118 to close the fare gate 110 and not let the user 102 to pass. Otherwise, if the payment authorization is approved or completed, then the fare gate application 116 may instruct the fare gate controller 118 to open the fare gate 110 and let the user 102 pass. Additional and/or detailed description with respect to fare entry, payment transaction, and crypto- gram generation is discussed in reference to at least FIGS. 3-7.

Figure 2:
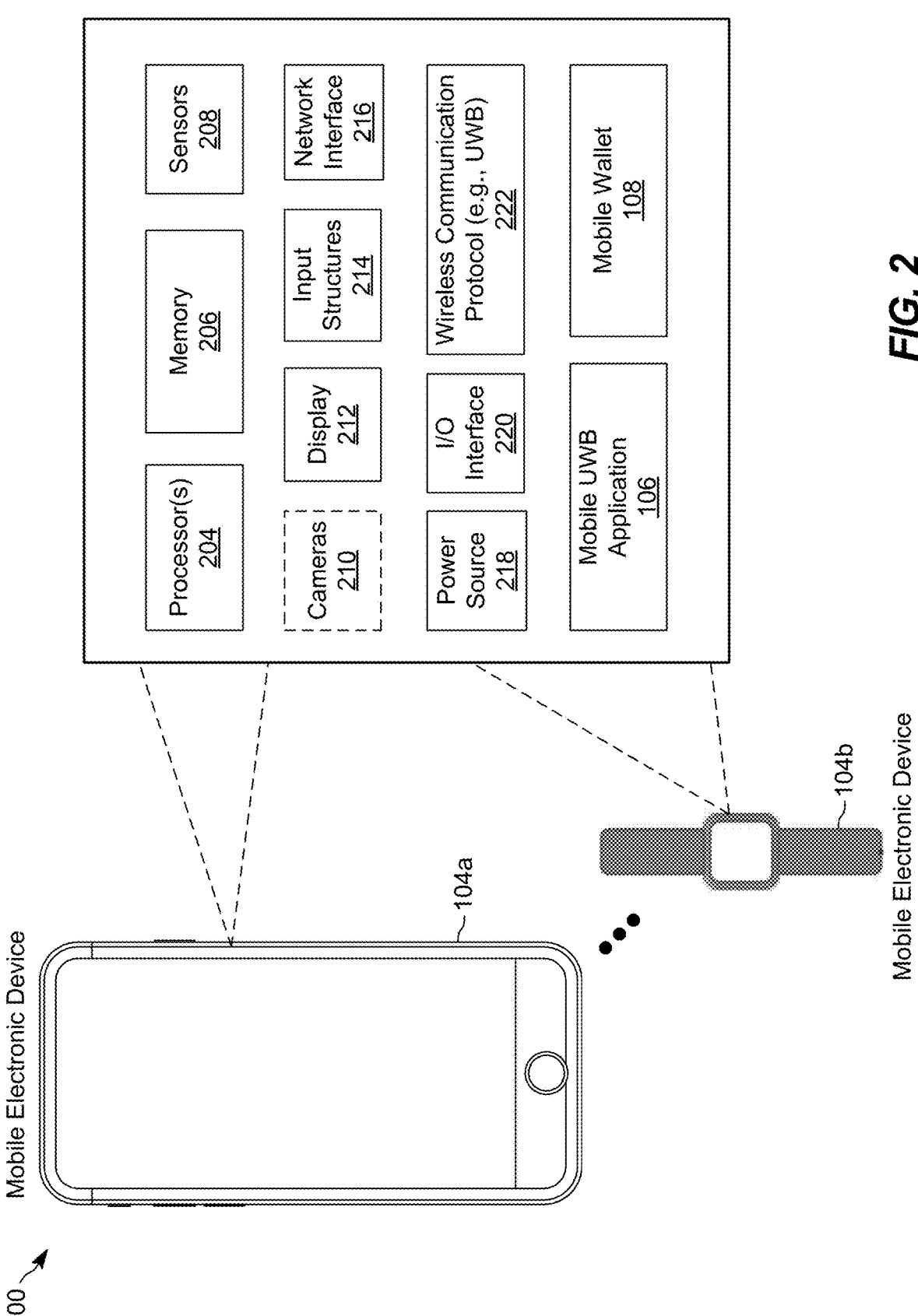
FIG. 2 illustrates an example diagram depicting various components associated with mobile electronic devices discussed herein.

FIG. 2 illustrates an example diagram 200 depicting various components associated with mobile communication or electronic devices 104 discussed herein. In particular embodiments, the mobile electronic devices 104 may include, for example, any of various personal electronic devices, such as a mobile phone electronic device 104a, a wearable device or a smartwatch 104b, a tablet computer electronic device (not shown), a laptop computer electronic device (not shown), and so forth. Although only two specific types of mobile electronic devices 104a and 104b are depicted in the diagram 200, it should be noted that this not by any way limiting and a variety of other types of mobile electronic devices are possible and within the scope of the present disclosure. Additionally, components 106, 108, and 204-222 may be associated with the other types of mobile electronic devices. For example, the components 106, 108, and 204-222 may be associated with a third type of mobile electronic device, such a tablet. As another example, the components 106, 108, and 204-222 may be associated with a fourth type of mobile electronic device, such a laptop computer. It should also be noted that some of the reference numerals have been kept same throughout this disclosure to refer to the same entities or components that have been previously described and to avoid repetition of information. However, it should be understood that this is not by any way limiting and additional description and functionalities of these components are possible and within the scope of the present disclosure.

As depicted, the mobile electronic device 104a or 104b (individually and/or collectively herein referred to as 104) may include, among other things, one or more processor(s) 204, memory 206, sensors 208, optional cameras 210, a display 212, input structures 214, network interfaces 216, a power source 218, an input/output (I/O) interface 220, a UWB communication protocol 222, the mobile UWB appli- cation 106, and a mobile wallet 108. It should be noted that FIG. 2 is merely one example of a particular implementation and is intended to illustrate the types of components that may be included as part of the mobile electronic device 104. Also, it should be noted that the mobile electronic device 104 is not by any way limited to the components depicted in FIG. 2 and additional components may be included and part of the mobile electronic device 104.

In particular embodiments, the one or more processor(s) 204 may be operably coupled with the memory 206 to perform various algorithms, processes, or functions. Such programs or instructions executed by the processor(s) 204 may be stored in any suitable article of manufacture that includes one or more tangible, computer-readable media at least collectively storing the instructions or routines, such as the memory 206.

The memory 206 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 204 to enable the mobile electronic device 104 to provide various function- alities. In some embodiments, the memory 206 may store one or more components of the mobile electronic device 104. For instance, the memory 206 may store the mobile UWB application 106 and the mobile wallet 108. These components may be stored in the memory 206 and execut- able by the one or more processors 204 to perform their functionalities discussed herein.

In particular embodiments, the sensors 208 may include, for example, one or more fingerprint sensors, cameras (e.g., depth cameras), touch sensors, microphones, motion detec- tion sensors, thermal detection sensors, light detection sen- sors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). By way of an example and not by way of limitation, the sensors 208 may include a fingerprint sensor, which is used to read the friction ridges of the fingers.

The cameras 210 may include any number of cameras (e.g., wide cameras, narrow cameras, telephoto cameras, ultra-wide cameras, depth cameras, and so forth) that may be utilized to capture various 2D and 3D images. The camera 210 are represented by dotted lines to indicate that they are optional and may not be included in every mobile electronic device 104. For example, the camera 210 may be included in the mobile electronic device 104a, but they may not be included in the mobile electronic device 104b.

The display 212 may include any display architecture (e.g., AMLCD, AMOLED, micro-LED, and so forth), which may provide further means by which users may interact and engage with the mobile electronic device 104. In some embodiments, one more of the cameras 210 may be disposed behind, underneath, or alongside the display 212 (e.g., one or more of the cameras 210 may be partially or completely concealed by the display 212), and thus the display 212 may include a transparent pixel region and/or semi-transparent pixel region through which the one or more concealed cameras 210 may detect light, and, by extension, capture images. It should be appreciated that the one more of the cameras 210 may be disposed anywhere behind or under- neath the display 210, such as at a center area behind the display 210, at an upper area behind the display 210, or at a lower area behind the display 210.

In particular embodiments, the input structures 214 may include any physical structures utilized to control one or more global functions of the mobile electronic device 104 (e.g., pressing a button to power "ON" or power "OFF" the mobile electronic device 104). The network interface 216 may include, for example, any number of network interfaces suitable for allowing the mobile electronic device 104 to access and receive data over one or more servers, cloud- based networks (e.g., a cloud-based service that may service hundreds or thousands of the mobile electronic device 104 and the associated users corresponding thereto), and/or distributed networks. The power source 218 may include any suitable source of power, such as a rechargeable lithium polymer (Li-poly) battery and/or an alternating current (AC) power converter that may be utilized to power and/or charge the mobile electronic device 104 for operation. Similarly, the I/O interface 220 may be provided to allow the mobile electronic device 104 to interface with various other electronic or computing devices, such as one or more auxiliary electronic devices.

In particular embodiments, the wireless communication protocol 222 may be a communication medium that enables the mobile electronic device 104 to wirelessly communicate with other communication, electronic, or computing devices. The wireless communication protocol 222 may include, for example and without limitation, Bluetooth, Wi-Fi, near-field communication (NFC), and ultra-wide (UWB) communication protocols. In particular embodiments, the wireless communication protocol 222 discussed herein is a UWB communication protocol. The UWB communication protocol is a short range, wireless communication protocol that operates through radio waves. It operates at very high frequencies (e.g., a broad spectrum of GHz frequencies) and may be used to capture highly accurate spatial and directional data. The UWB communication protocol provides fine precision in location detection, fast transmission of data, and high reliability. The UWB communication protocol may enable the mobile electronic device 104 to precisely and accurately locate other UWB-enabled devices (e.g., fare gate 110).

Having the UWB communication protocol on the mobile electronic device 104 makes it a UWB-enabled device that may precisely lock onto an object (e.g., fare gate 110), discover its location, and communicate with it. Once a UWB-enabled device, such as mobile phone device 104a or wearable device 104b, is near another UWB device (e.g., fare gate 110), the two devices start ranging (e.g., calculating time of flight (ToF) between devices or roundtrip time of challenge/response packets between the two devices). The UWB communication protocol may achieve greater accuracy and may instantaneously tracks the device's movements in real-time. In doing so, UWB-enabled devices may understand both motion and relative position.

The UWB communication protocol delivers greater accuracy in line-of-site (LoS) and strong localization in non-line-of-sight (nLoS) scenarios and is capable of managing environments in which numerous walls, people and other obstacles would typically block these signals. Using angle-of-arrival (AoA) technology, the real-time accuracy of UWB measurements provides highly precise device location services. UWB-enabled devices may also determine whether an object is stationary, moving closer or moving away.

By way of an example and without limitation, when a user carrying a UWB-enabled device (e.g., mobile phone 104a) approaches another UWB-enabled device, such as the fare gate 110, the UWB anchors 112 on the fare gate 110 may determine that the user intends to pass through the fare gate 110. Based on the user intention that is precisely determined through the UWB technology (e.g., UWB anchors 112), the gate 110 may be instructed to automatically get opened without explicit user input (e.g., user pressing a button to open the gate, tapping a transit card/pass, etc.). As discussed elsewhere herein, the fare gate 110 may automatically get opened based on a combination of detection through the UWB technology and payment through the mobile wallet 108. This is further shown and discussed below in reference to at least FIG. 3.

Figure 3:
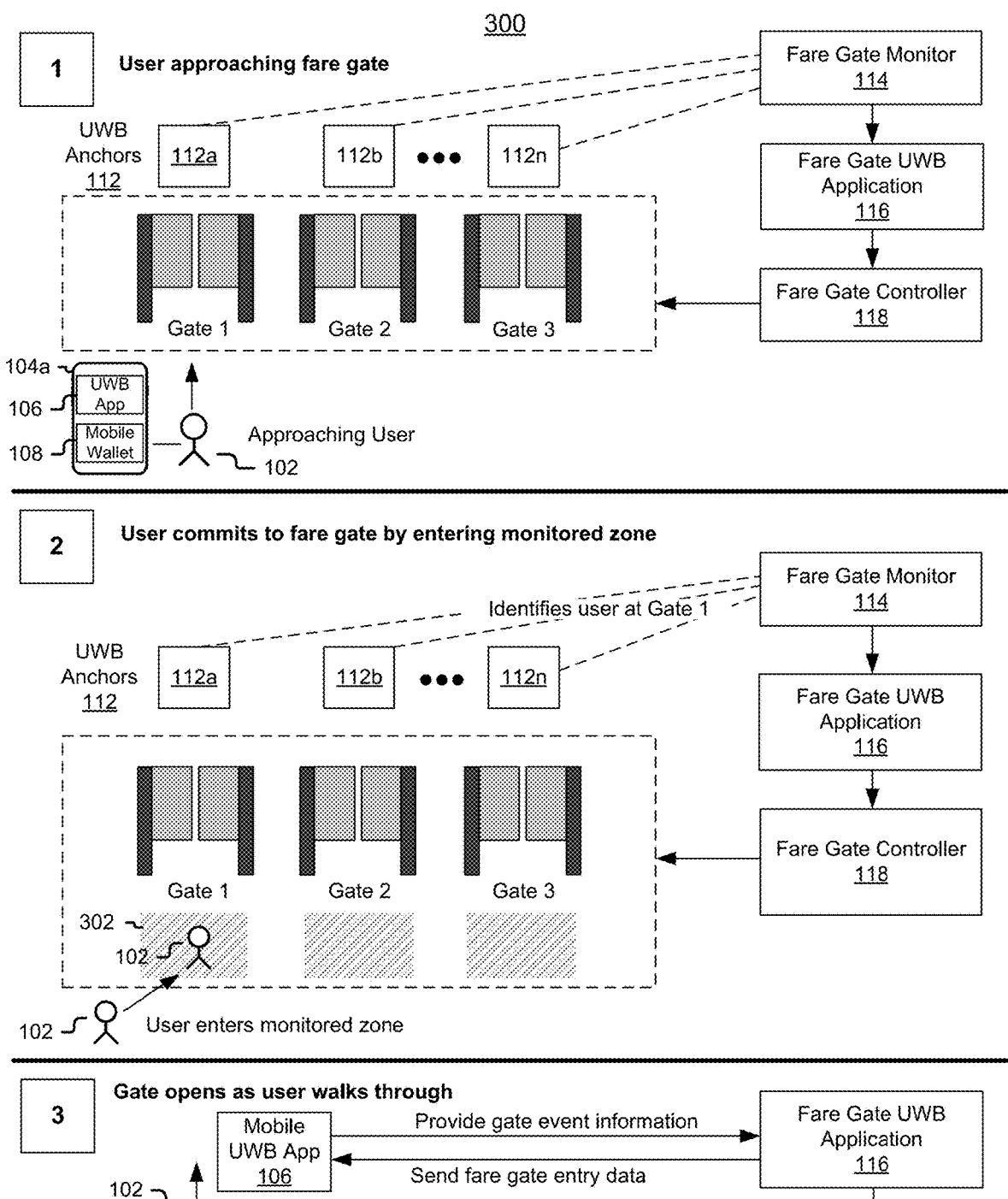
FIG. 3 illustrates an example environment associated with a fare gate entry using ultra-wide band (UWB) technology.

FIG. 3 illustrates an example environment 300 associated with a fare gate entry using UWB technology. In particular, the environment 300 depicts a user contactless entry through a fare gate using the UWB technology. As depicted, the environment 300 is split into three scenarios, each scenario depicting actions performed by the user 102, by the fare gate, and one or more components of the improved transit fare gate ecosystem discussed herein. In the first scenario, the user 102 approaches the first fare gate among the three fare gates (Gate 1, Gate 2, Gate 3) that may be situated at a particular transit station, such as a train station. The user 102 may be carrying a UWB-enabled mobile electronic device 104a that includes the mobile UWB application 106 and the mobile wallet 108. One or more UWB anchors 112a, 112b, ..., 112n (individually and/or collectively herein referred to as 112) may be situated around each of the fare gates. These UWB anchors 112 may enable the fare gates (Gate 1, Gate 2, Gate 3) to be also UWB-enabled devices that may precisely sense other UWB-enabled devices (e.g., mobile electronic device 104a) when they are nearby or approaching towards them.

In the second scenario, the user 102 commits to a fare gate, particularly Gate 1, by entering into a monitored zone 302. The monitored zone 302 may be a specific spot, location, or area near the fare gate at which a UWB-enabled device in that zone becomes detectable by the one or more UWB anchors 112. For instance, as the user 102 carrying the UWB-enabled device 104a enters in the monitored zone 302 of Gate 1, the one or more UWB anchors 112 around the Gate 1 may identify the user 102. This may be monitored by the fare gate monitor 114. Specifically, the fare gate monitor 114 may identify, using the UWB anchors 112, location of the user 102 at or around Gate 1 and a user intent of passing through the Gate 1. The fare gate monitor 114 may pass this information to the fare gate UWB application 116 to perform the next steps, as shown and discussed in the third scenario.

In the third scenario, after the user 102 enters in the monitored zone of Gate 1, the mobile UWB application 106 on the user's mobile electronic device 104a may provide gate event information to the fare gate UWB application 116. The gate event information may include, for example, (1) location information indicating a precise location of the user's mobile electronic device 104a with respect to Gate 1 and (2) balance information indicating an available balance in the user's mobile wallet 108 to pay for the fare. The fare gate UWB application 116 may also receive some gate event information from the fare gate monitor 114. For instance, the fare gate monitor 114 may also notify the fare gate UWB application 116 that the user 102 is at Gate 1. Responsive to confirming that the user intends to pass through the fare gate and that the user has sufficient balance to cover/pay for the fare, the fare gate UWB application 116 may send a trigger or instruction to the fare gate controller 118 to open Gate 1. The fare gate controller 118 may then open Gate 1 and the user 102 walks through the Gate 1, as depicted in the third scenario. In addition to sending the trigger to open the fare gate, the fare gate UWB application 116 may also send fare gate data to the mobile UWB application 106 for authorizing and/or clearing a payment corresponding to the user's fare entry through the fare gate (e.g., Gate 1). The fare gate data may include, for example and without limitation, time stamp, station location identifier, fare gate identifier, etc. The mobile UWB application 106 may use the fare gate data to generate a cryptogram using the mobile wallet 108 and then communicate with the merchant payment platform 120 and the payment network 122 to authorize a payment corresponding to the user's fare entry using the cryptogram, as shown and discussed in further detail with respect to at least FIG. 4.

Figure 4:
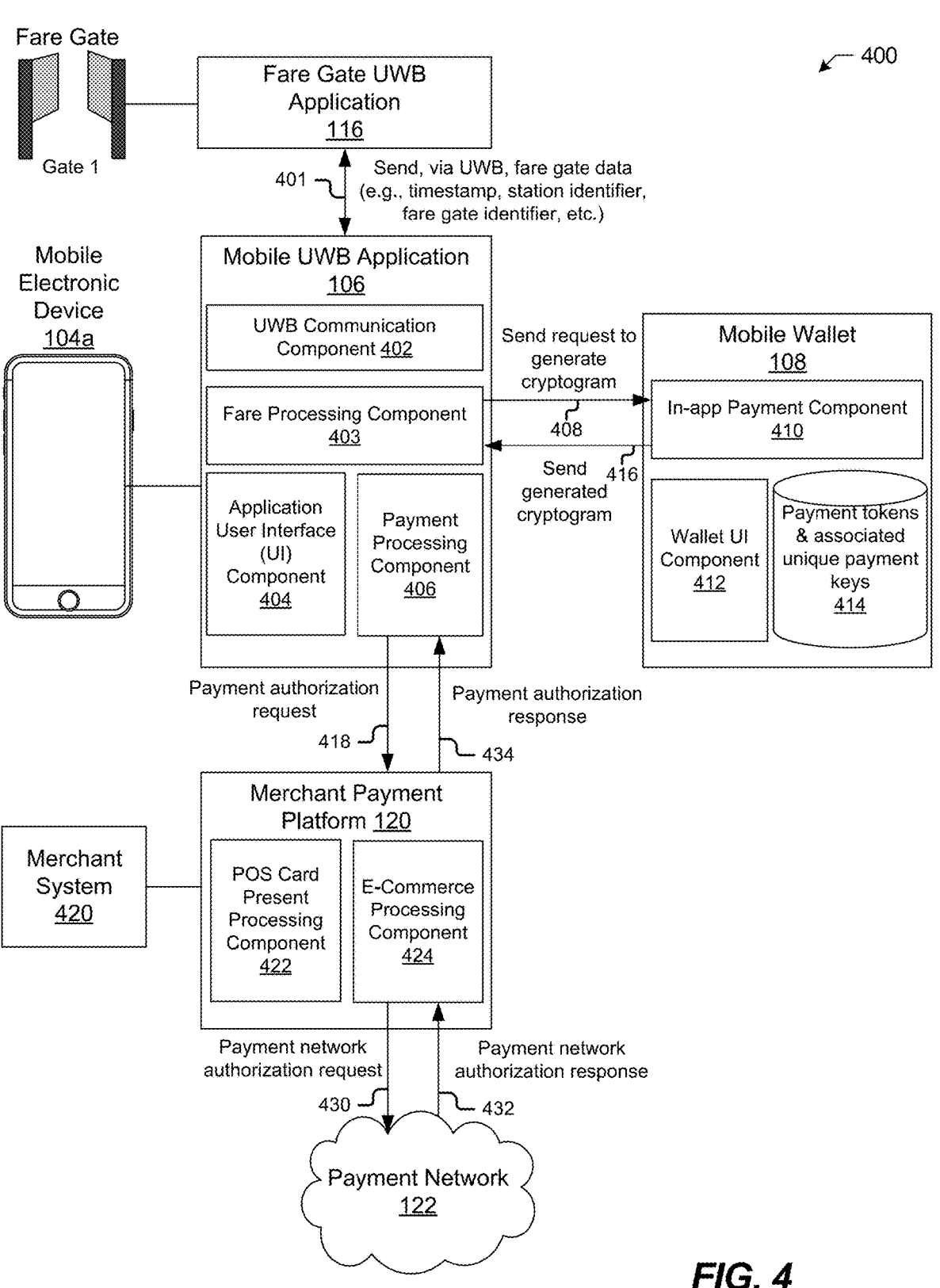
FIG. 4 illustrates an example environment associated with a payment transaction and authorization process upon a fare gate entry using the UWB technology discussed herein.

FIG. 4 illustrates an example environment 400 associated with a payment transaction and authorization process upon a fare gate entry using UWB technology discussed herein. In particular, the environment 400 illustrates in sequence a plurality of components that may be involved when clearing and/or authorizing a fare entry payment corresponding to the user's entry through fare gate 1. Responsive to opening fare gate 1 as discussed in FIG. 3, the fare gate UWB application 116 may send, via UWB communication channel or protocol, fare gate data (e.g., timestamp, station identifier, fare gate identifier, etc.) to the mobile UWB application 106, as indicated by reference numeral 401.

The fare gate data may be received by a UWB communication component 402 of the mobile UWB application 106. The mobile UWB application 106 may be running or executing on a mobile electronic device, such as mobile electronic device 104a. The UWB communication component 402 may send the fare gate data to an application user interface (UI) component 404. The application UI component 404 may present the fare gate data reflecting information relating to user's entry through Gate 1, a fare entry payment associated with this event, and a fare processing approval request on a display (e.g., display 212) of the mobile electronic device 104a. The user 102 may approve or decline the fare processing approval request. If in case, the user 102 declines the fare processing approval request, then this indication may be sent back to the fare gate UWB application 116, which may trigger the fare controller 118 to close the fare gate and not let the user pass.

If the user approves the fare processing approval request, then a fare processing component 403 of the mobile UWB application 106 sends a request to the mobile wallet 108 to generate a UWB cryptogram, as indicated by reference numeral 408. When sending the request to the mobile wallet 108, the fare processing component 403 may additionally send one or more of the fare gate data received from the fare gate UWB application 116 and unique device characteristics (e.g., device identifier, device name, IMEI number, etc.) associated with the mobile electronic device 104a to the mobile wallet 108. The mobile wallet 108 may generate the cryptogram based on one or more of the fare gate data and the unique device characteristics. In some embodiments, the request to generate the cryptogram may be sent via an application programming interface (API). For instance, the fare processing component 403 may send the request to generate the cryptogram through an app-to-app API call to the mobile wallet 108.

In particular embodiments, the request to generate the cryptogram may be received by an in-app payment component 410 of the mobile wallet 108. The in-app payment component 410 may be configured to generate a payment cryptogram corresponding to a fare entry or transit payment. In addition to the in-app payment component 410, the mobile wallet 108 may include a wallet UI component 412 and store secure payment tokens and payment keys 414. The wallet UI component 412 may be configured to present a list of different payment cards (e.g., credit cards, debit cards, etc.) to the user for selecting a default payment card for transit payments or other types of payments. The user selection of the default payment card may be stored in the mobile wallet 108.

In some embodiments, a unique payment token or a payment key may be associated with each of the different payment cards. The unique payment tokens and/or payment keys may be known only to the payment network 122 that issued the different payment cards to the user. The in-app payment component 410 may securely generate the cryptogram using the payment tokens and/or the payment keys provided by the payment network 122 (e.g., card issuer). For instance, when a user tries to make a contactless entry through a fare gate, a charge corresponding to the contactless entry is placed on the default payment card chosen by the user in the mobile wallet 108. When the mobile UWB application 106 sends a request along with the fare gate data and unique device characteristics to the mobile wallet 108 to generate a cryptogram for this contactless entry, the in-app component 410 may securely generate the cryptogram by encrypting one or more of the fare gate data, the unique device characteristics, and the default payment card details using the issuer's payment key (or cryptographic key) associated with the default payment card for a particular payment token. Generating the cryptogram based on encryption using wallet cryptographic key is advantageous as it secures the user identify and associated payment information when the user makes a contactless entry through a fare gate.

Responsive to generating the payment cryptogram, the in-app payment component 410 may send the generated cryptogram (e.g., encrypted using issuer's payment or cryptographic key for a payment token) to the fare processing component 403 of the mobile UWB application 106, as indicated by reference numeral 416. The fare gate processing component 403 may send the generated cryptogram to the payment processing component 406, which may formulate a payment authorization message containing approval information relating to fare entry payment corresponding to user's entry through the fare gate. The payment authorization message may be formulated based on one or more of the fare gate data (e.g., timestamp, station identifier, fare gate identifier), unique device data or characteristics (e.g., device identifiers.), and generated cryptogram. The payment processing component 406 may send a payment authorization request to authorize the fare entry payment to the merchant payment platform 120, as indicated by reference numeral 418.

The merchant payment platform 120 may be a platform associated with a merchant system 420 to manage payment transactions. In particular embodiments, the merchant system 420 may be a public transit provider or a public transit system. As depicted, the merchant payment platform 120 may include a point-of-sale (POS) card present processing component 422 and an e-commerce processing component 424. The POS card present processing component 422 may be configured to manage physical payment transactions occurring at the merchant system 420. For instance, the POS card present processing component 422 may authorize and/or clear payment transactions that may be done using physical payment cards (e.g., credit cards, debits, prepaid cards, reloadable cards, etc.) and/or transit passes. By way of an example and without limitation, the POS card present processing component 422 may authorize and/or clear payment transactions when a user pays for a transit fare by inserting their payment card into a card reader. The e-commerce processing component 424 may be configured to manage contactless or handsfree payment transactions occurring at the merchant system 420 using mobile wallet and UWB technology discussed herein. For instance, the e-commerce processing component 424 may authorize and/or clear payment transactions that may be done using mobile wallet 108. By way of an example and without limitation, the e-commerce processing component 424 may authorize and/or clear payment transactions when a user walks through a fare gate and the user is charged for a payment corresponding to the user's entry through the fare gate using a default payment card associated with the mobile wallet 108 without explicit user input (e.g., without user tapping, inserting, or showing the payment card).

In particular embodiments, the e-commerce processing component 424 of the merchant payment platform may receive the payment authorization request from the payment processing component 406 of the mobile UWB application 106. The payment authorization request may include a payment authorization message and a cryptogram. The e-commerce processing component 424 may formulate a payment network authorization message to send to the payment network 122 for payment authorization. The payment network authorization message may include the same payment authorization message received from the mobile UWB application 106 or a modified message. The e-commerce processing component 424 may formulate the payment network authorization message using existing payment network specifications for token-based e-commerce payments and may populate existing fields with relevant data (e.g., fare gate data, unique device data or characteristics, etc.). In some embodiments, the payment network authorization message may include support of an additional data value for an existing field (e.g., payment form factor) to represent the fact that the payment originated from a UWB location-initiated transaction.

The e-commerce processing component 424 may send a payment network authorization request to the payment network 122. The payment network authorization request may include the payment network authorization message and the cryptogram generated using the mobile wallet 108. The payment network 122 may be an approving and/or issuing financial institution (e.g., credit card issuer or bank) that validates the payment transaction associated with the received payment network authorization message and the cryptogram. The payment network 122 may validate the payment transaction using issuer key associated with a payment card with which the user has performed the transaction (e.g., paying for transit fare). For instance, the cryptogram may be generated by encrypting the information using issuer's payment key, which only the payment network 122 (e.g., card issuer) has secure access to in a hardware security module. This protects the bank against transaction disputes.

The payment network 122 may validate the payment transaction by decrypting the information in the cryptogram using the corresponding payment key that it has and then verifying the payment details (e.g., credit card details, user details associated with the payment card, etc.). The validation may include, for example, verifying whether the payment card associated with the mobile wallet 108 has sufficient balance or credit limit to pay for the transit fare. As another example, the validation may include, for example, verifying whether the user details associated with the payment transaction matches with the user details saved with the payment network 122. As another example, the validation may include, for example, verifying whether the user details associated with the payment transaction matches with the user details saved with the payment network 122.

Responsive to performing payment validation or payment authorization, the payment network 122 may send results of its validation or authorization back to the merchant payment platform 120 in the form of a payment network authorization response, as indicated by reference numeral 432. In particular embodiments, the payment network authorization response may be received by the e-commerce processing component 424. The payment network authorization response may include whether the payment transaction for a transit fare is approved or declined. The merchant payment platform 120 may further send the results of the payment validation or authorization to the mobile UWB application 106 (that generated the transaction) in the form of a payment authorization response, as indicated by reference numeral 434.

As discussed elsewhere herein, the mobile UWB application 106 may communicate the received payment authorization response (e.g., results of the payment authorization) to the fare gate UWB application 116 over the UWB channel. For instance, the mobile UWB application 106 may notify the fare gate UWB application 116 whether the payment for the fare gate event is completed or failed. The fare gate UWB application 116 may perform an action based on the payment authorization response. For instance, if the payment authorization is failed, then the fare gate UWB application 116 may instruct the fare gate controller 118 to close the fare gate (e.g., Gate 1) and not let the user to pass. Otherwise, if the payment authorization is approved or completed, then the fare gate application 116 may instruct the fare gate controller 118 to open the fare gate and let the user pass.

Figure 5:
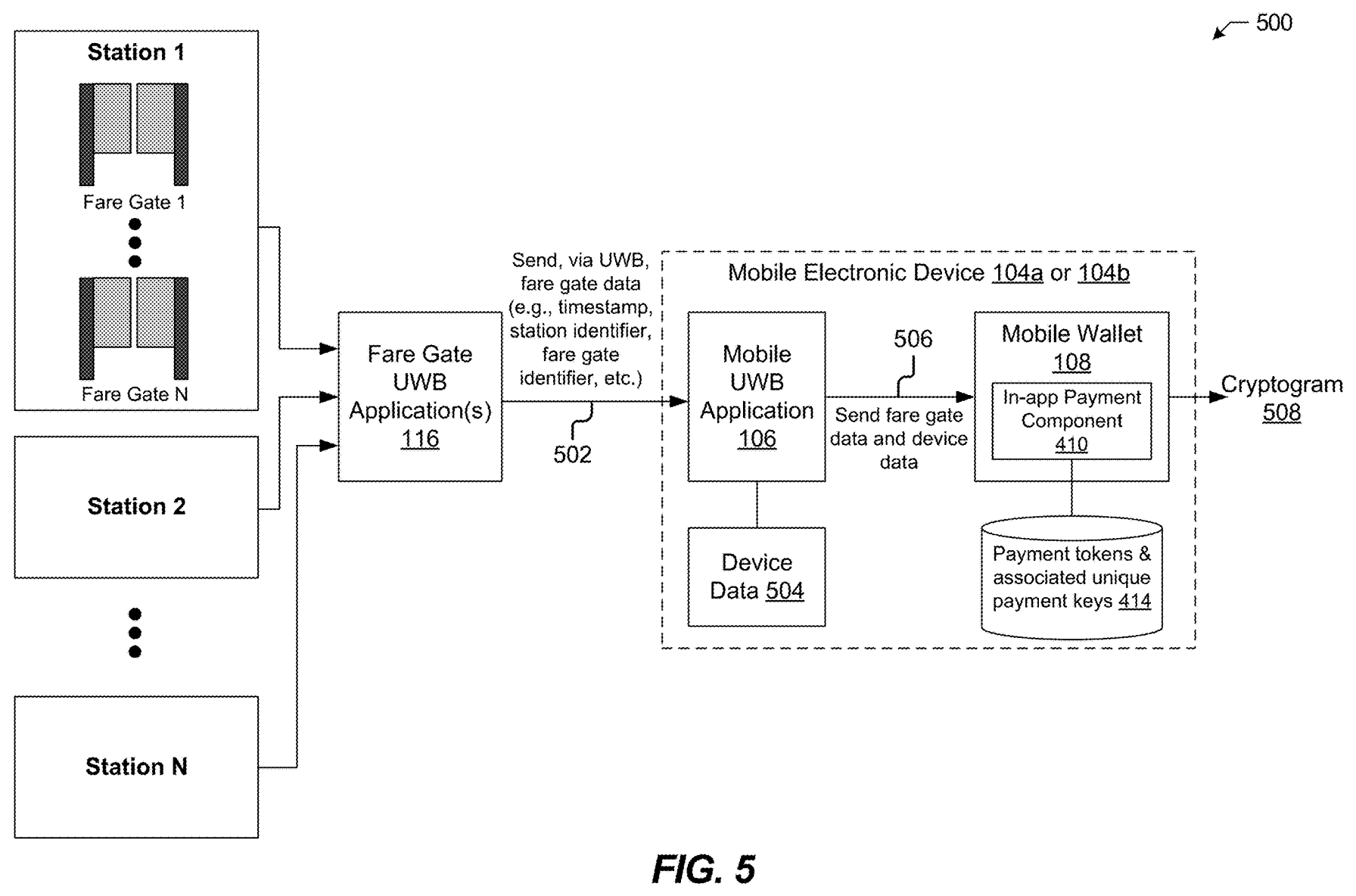

FIG. 5 illustrates an example environment 500 associated with a payment cryptogram generation process. There may be a plurality of transit stations, such as station 1, station 2, . . . , station N, and each of the transit stations may include a plurality of fare gates, such as fare gate 1, fare gate 2, . . . , fare gate N. The fare gate UWB application 116 may manage (e.g., control) the plurality of transit stations 1 through N with a unique number of fare gates in each of the stations. When a fare gate event (e.g., user carrying a UWB-enabled mobile electronic device walks through the fare gate) occurs at any of the fare gates at a particular station, the fare gate UWB application 116 sends fare gate data or relating event information (indicated by reference numeral 502) to the mobile electronic device 104 of the user through which the fare gate event occurred. As discussed elsewhere herein, the fare gate data or event information may include, for example and without limitation, timestamp (e.g., date and time) in HH: MM: SS yyyy-mm-dd format, station identifier of variable length, and fare gate identifier of variable length.

The fare gate data from the fare gate UWB application 116 may be received by the mobile UWB application 106. The mobile UWB application 106 may be executing or running on the mobile electronic device 104, which may include a mobile phone 104a or a wearable device (e.g., smartwatch) 104b discussed herein. The mobile UWB application 106 may determine device data 504 that is unique to the device 104. The device data 504 may include device identifiers unique to the device 104, such as, for example, IMEI, device name, etc. The mobile UWB application 106 may send the fare gate data as well as the device data (indicated by reference numeral 506) to the mobile wallet 108 for cryptogram calculation. The mobile wallet 108 may store a plurality of payment tokens and unique issuer cryptographic or payment keys for these tokens, as indicated by reference numeral 414. The plurality of payment tokens may be associated with a plurality of payment cards (e.g., credit cards, debit cards, etc.). The payment tokens may be supported by major global payment schemes or payment networks (e.g., various financial institutions or banks) supporting EMV payment standards. Once a user selects a previously provisioned card in the mobile wallet 108, that card becomes the default payment card to use for a payment transaction (e.g., to pay for a transit fare when passing through a fare gate). The financial institution that issued the payment token for the payment card does not have to do anything to support the UWB method of payment discussed herein in order to accept payments originating using this method.

The in-app payment component 410 of the mobile wallet 108 may calculate a cryptogram 508 by (1) concatenating the fare gate data (or relating event information) and the device data, (2) applying a hash function (e.g., SHA-2) to the concatenated result obtain from (1), and (3) encrypting the hashed result using wallet cryptographic key for payment token associated with a payment card with which a payment transaction has been made at the fare gate. The cryptogram 508 generated in such a way conceals the user identity, financial details of the user, and protects the financial institutions (e.g., banks) against transaction disputes. The mobile UWB application 106 may use the generated cryptogram 508 to send a request to the merchant payment platform 120 and later to the payment network 122 for payment authorization, as discussed elsewhere herein.

Figure 6:
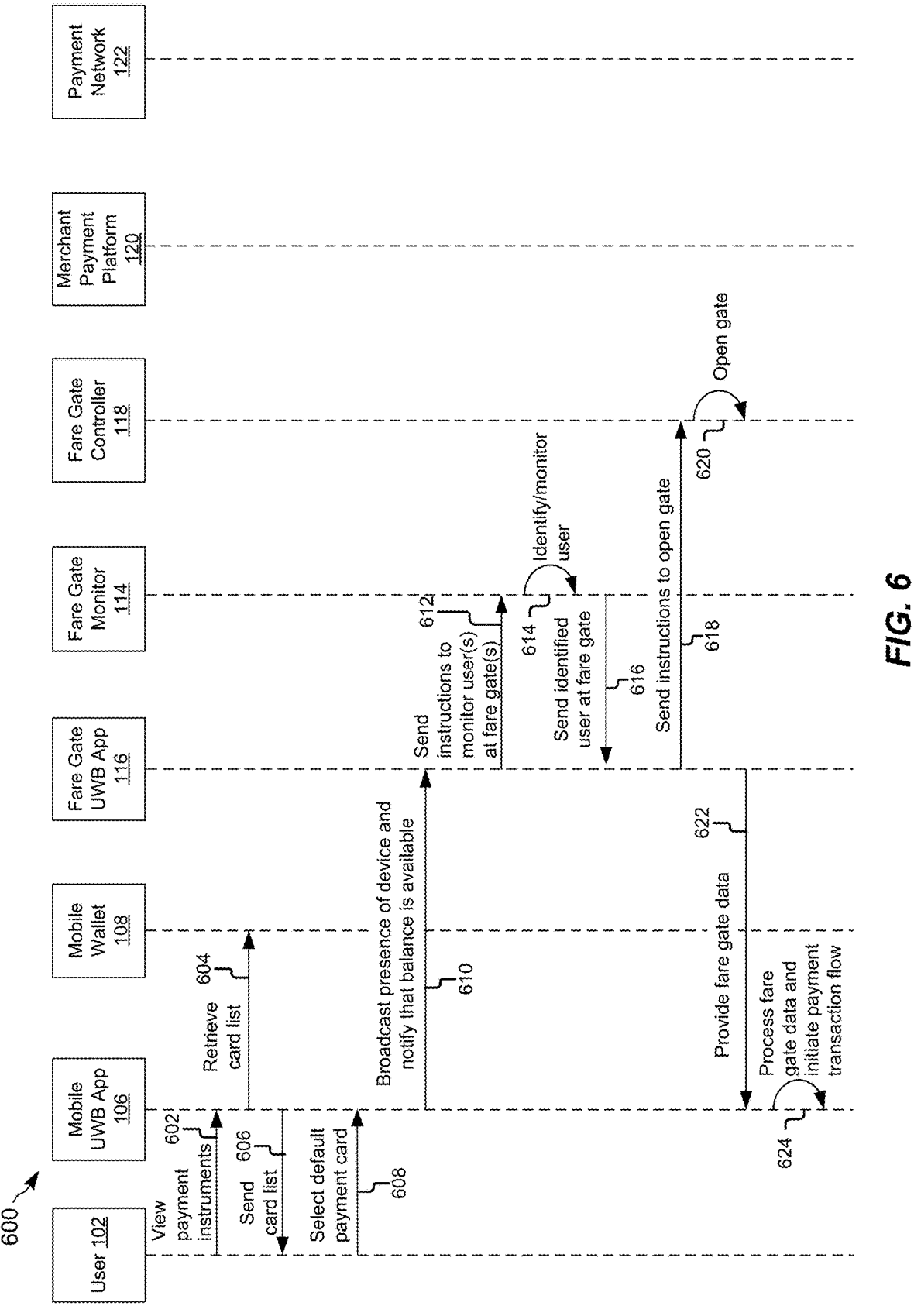
FIG. 6 illustrates an example sequence diagram depicting example interactions between various components of an improved transit fare gate ecosystem discussed herein during a user's entry through a fare gate.

FIG. 6 illustrates an example sequence diagram 600 depicting example interactions between various components of an improved transit fare gate ecosystem discussed herein during a user's entry through a fare gate. As depicted, the user 102 may send a request to the mobile UWB application 106 to view different payment instructions (e.g., payment mechanisms or payment cards), as indicated by reference numeral 602. The mobile UWB application 106 may retrieve a list of payment cards associated with the user 102 from the mobile wallet 108, as indicated by reference numeral 604. The mobile UWB application 106 may send the card list to the user 102, as indicated by reference numeral 606. For instance, the application UI component 404 of the mobile UWB application 106 may display the list of different payment cards (e.g., credit cards, debit cards, etc.) to the user 102. The user 102 may select a default payment card from the card list for payment transactions (e.g., payments for a transit fares), as indicated by reference numeral 608.

When the user 102 carrying a UWB-enabled device (e.g., mobile electronic device 104) including the mobile UWB application 106 approaches another UWB-enabled device, such as fare gate 110, the mobile UWB application 106 may broadcast presence of the device and notify that a balance is available to pay for a transit fare to the fare gate UWB application 116, as indicated by reference numeral 610. The mobile UWB application 106 may communicate with the fare gate UWB application 116 over the UWB communication channel or protocol. The fare gate UWB application 116 may send instructions to the fare gate monitor 114 to monitor users at fare gates located at a particular transit station (e.g., train station), as indicated by reference numeral 612. The fare gate monitor 114, using UWB anchor(s) situation around the fare gate 110, may identify the user 102, as indicated by reference numeral 614. The fare gate monitor 114 may send indication of the identified user at the fare gate to the fare gate UWB application 116, as indicated by reference numeral 616. Responsive to receiving the indication that the user is at the fare gate and determining that the user has sufficient balance to cover for the transit fare, the fare gate UWB application 116 may send instructions or a trigger to the fare gate controller 118 to open the fare gate (e.g., fare gate 110), as indicated by reference numeral 618. Upon receiving the trigger, the fare gate controller 118 may open the fare gate, as indicated by reference numeral 620. In addition to sending the trigger to the fare gate controller 118, the fare gate UWB application 116 may send or provide the fare gate data (e.g., station identifier, fare gate identifier, etc.) to the mobile UWB application 106, as indicated by reference numeral 622. The mobile UWB application 106 may process the fare gate data and initiate the payment transaction flow (e.g., shown and discussed in reference to FIG. 7), as indicated by reference numeral 624.

Figure 7:
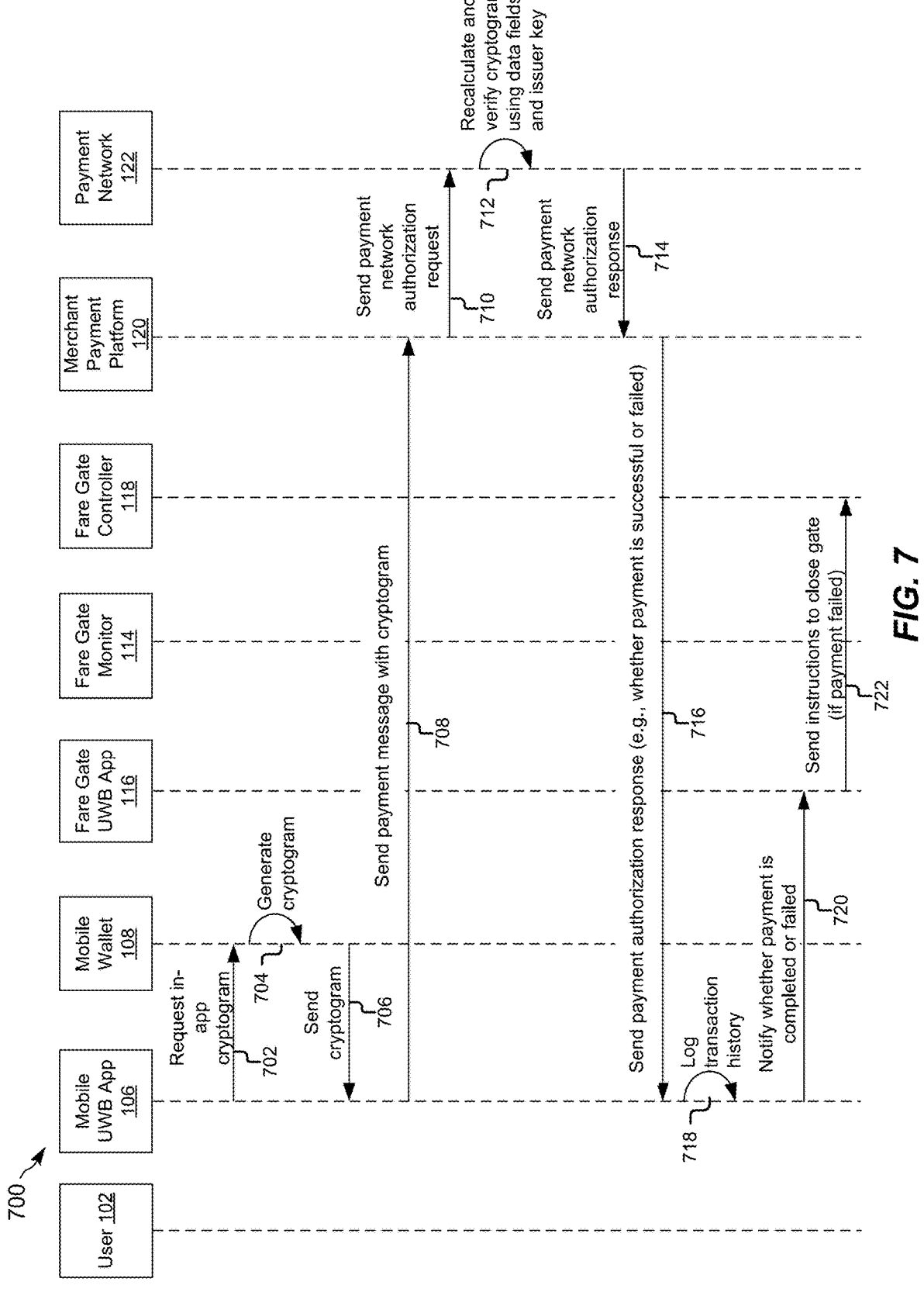
FIG. 7 illustrates an example sequence diagram depicting example interactions between various components of an improved transit fare gate ecosystem discussed herein when a payment transaction and authorization process is initiated.

FIG. 7 illustrates an example sequence diagram 700 depicting example interactions between various components of an improved transit fare gate ecosystem discussed herein when a payment transaction and authorization process is initiated. As depicted, once the fare gate UWB application 116 has performed an action with respect to a fare gate (e.g., fare gate is opened) and sent the fare gate data, the mobile UWB application 106 may request an in-app cryptogram from the mobile wallet 108, as indicated by reference numeral 702. The request may be sent or made via an API call. The mobile wallet 108 may generate the cryptogram (indicated by reference numeral 704) and send the cryptogram (indicated by reference numeral 706) to the mobile UWB application 106. The mobile UWB application 106 may formulate a payment authorization message and send the message along with the cryptogram to the merchant payment platform 120, as indicated by reference numeral 708.

The merchant payment platform 120 may send the same received payment authorization message or a modified message along with the received cryptogram to the payment network 122 in the form of a payment network authorization request, as indicated by reference numeral 710. Upon receiving the payment network authorization request, the payment network 122 may recalculate and verify (indicated by reference numeral 712) the cryptogram using data fields included in the payment authorization message and the payment network or issuer's key with which the cryptogram has been encrypted. Upon performing the verification, the payment network 122 may send results of its verification to the merchant payment platform 120 in the form of a payment network authorization response, as indicated by reference numeral 714. The merchant payment platform 120 may send a payment authorization response to the mobile UWB application 106, as indicated by reference numeral 716. The payment authorization response may include, for example, whether the payment for the transit fare is successful or failed. The mobile UWB application 106 may log the transaction history, as indicated by reference numeral 718. Furthermore, the mobile UWB application send a notification to the fare gate UWB application 116 to notify result of the payment transaction (i.e., whether the payment is completed or failed), as indicated by reference numeral 720. If in case the notification from the mobile UWB application 106 indicates that the payment is failed, the fare gate UWB application 116 may send an instruction or a trigger to the fare gate controller 118 to close the gate and not let the user pass, as indicated by reference numeral 722.

In some embodiments, to avoid the scenario of payment failure and closing the fare gate, as discussed with respect to step 722, an alternate payment method may be implemented. For instance, once the default payment card is selected by the user, a periodic pre-authorization process may be performed based on historic behaviour of transit user. This will ensure funds are available to cover the intended fare when the user intends to access a transit system as the transit merchant will be able to use the successful authorization up to the authorization amount for subsequent transactions. If in case the periodic pre-authorization fails, the user may be alerted to change their payment method as their current default payment card has been declined.

FIG. 8 illustrates a flow diagram of an example method 800 for performing an action with respect to a UWB-enabled device (e.g., fare gate) and generating a payment cryptogram for authorizing a payment transaction relating to the action, in accordance with the presently disclosed embodiments. The method 800 may be performed utilizing one or more processing devices (e.g., the one or more processors 204 of the mobile electronic device 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 800 may begin at block 810 with one or more processing devices (e.g., one or more processors 204 of the mobile electronic device 104) sending, via an UWB communication protocol from a first application associated with a first UWB-enabled device to a second application associated with a second UWB-enabled device, (1) location information indicating a location of the first UWB-enabled device with respect to the second UWB-enabled device and (2) balance information indicating an available monetary balance on the first UWB-enabled device. In particular embodiments, the first UWB-enabled device discussed herein is a mobile electronic device (e.g., a mobile phone electronic device 104a or a wearable electronic device 104b). The second UWB-enabled device is a fare gate located at a transit station or terminal. In particular embodiments, one or more UWB anchors may be installed on or around the fare gate that enables the fare gate to be the second UWB-enabled device.

The first application associated with the first UWB-enabled device and the second application associated with the second UWB-enabled device may both relate to or are payment applications, and the first and second applications may communicate with each other over UWB communication channel or protocol. For instance, the first application associated with the first UWB-enabled device is the mobile UWB application 106 and the second application associated with the second UWB-enabled device is the fare gate UWB application 116. In particular embodiments, the second application associated with the second UWB-enabled device (e.g., fare gate 110) uses the location and balance information received from the first application (e.g., mobile UWB application 106) to perform an action with respect to the second UWB-enabled device. The action may include, for example, automatically opening the fare gate for a user associated with the first UWB-enabled device (e.g., mobile electronic device 104) to pass through the fare gate without require explicit input (e.g., showing transit card, tapping or inserting payment card, etc.) from the user.

The method 800 may then continue at block 820 with the one or more processing devices (e.g., one or more processors 204 of the mobile electronic device 104) receiving, from the second application associated with the second UWB-enabled device, event information relating to the action performed with respect to the second UWB-enabled device. The event information (e.g., fare gate data) may include, for example and without limitation, a station identifier identifying a transit station at which a fare gate is located through which the user has or tried to pass, a fare gate identifier identifying the fare gate at which the action is performed, and a time stamp indicating a time at which the action is performed, etc.

The method 800 may then continue at block 830 with the one or more processing devices (e.g., one or more processors 204 of the mobile electronic device 104) determining, by the first application associated with the first UWB-enabled device, unique device characteristics associated with the first UWB-enabled device. The unique device characteristics may include, for example and without limitation, a unique device name associated with the mobile electronic device (e.g., mobile electronic device 104a), a unique serial number or identifier associated with the mobile electronic device, an international mobile equipment identity (IMEI) number associated with the mobile electronic device, etc.

The method 800 may then continue at block 840 with the one or more processing devices (e.g., one or more processors 204 of the mobile electronic device 104) generating, by the first application associated with first UWB-enabled device in cooperation with an electronic wallet (e.g., mobile wallet 108) stored on the first UWB-enabled device, a payment cryptogram based on the event information and the unique device characteristics. The payment cryptogram may be used for securely authorizing a payment transaction relating to the action performed with respect to the second UWB-enabled device. In particular embodiments, generating the payment cryptogram may include (1) concatenating the event information and the unique device characteristics, (2) applying a hash function to concatenated result, and (3) encrypting hashed concatenated result using a unique cryptographic or payment key provided by a payment network for a payment mechanism with which the payment transaction is made. In some embodiments, authorizing the payment transaction may include verifying the encrypted cryptogram using the unique payment key provided by the payment network, such as payment network 122.

The method 800 may then continue at block 850 with the one or more processing devices (e.g., one or more processors 204 of the mobile electronic device 104) sending, by the first application associated with the first UWB-enabled device, a payment authorization request including the payment cryptogram to a payment platform (e.g., merchant payment platform 120) associated with the second UWB-enabled device for authorizing the payment transaction. In some embodiments, the method 800 may further include generating, by the first application associated with the first UWB-enabled device, a payment authorization message based on the event information and the unique device characteristics. The payment authorization request that is sent to the payment platform may further include the payment authorization message in addition to the payment cryptogram.

In particular embodiments, the method 800 may further include receiving, by the first application associated with the first UWB-enabled device from the payment platform associated with the second UWB-enabled device, a payment authorization response and sending, by the first application associated with the first UWB-enabled device to the second application associated with the second UWB-enabled device, the payment authorization response. The payment authorization response may include an indication of whether the payment transaction is approved or declined. In some embodiments, the second application (e.g., fare gate UWB application 116) may modify the action with respect to the second UWB-enabled device based on the payment authorization response. For example, if the fare gate was earlier instructed to open, but the payment transaction approval is declined, then the fare gate UWB application 116 may instruct the fare gate controller 118 to close the fare gate and not let the user pass.

Figure 9:
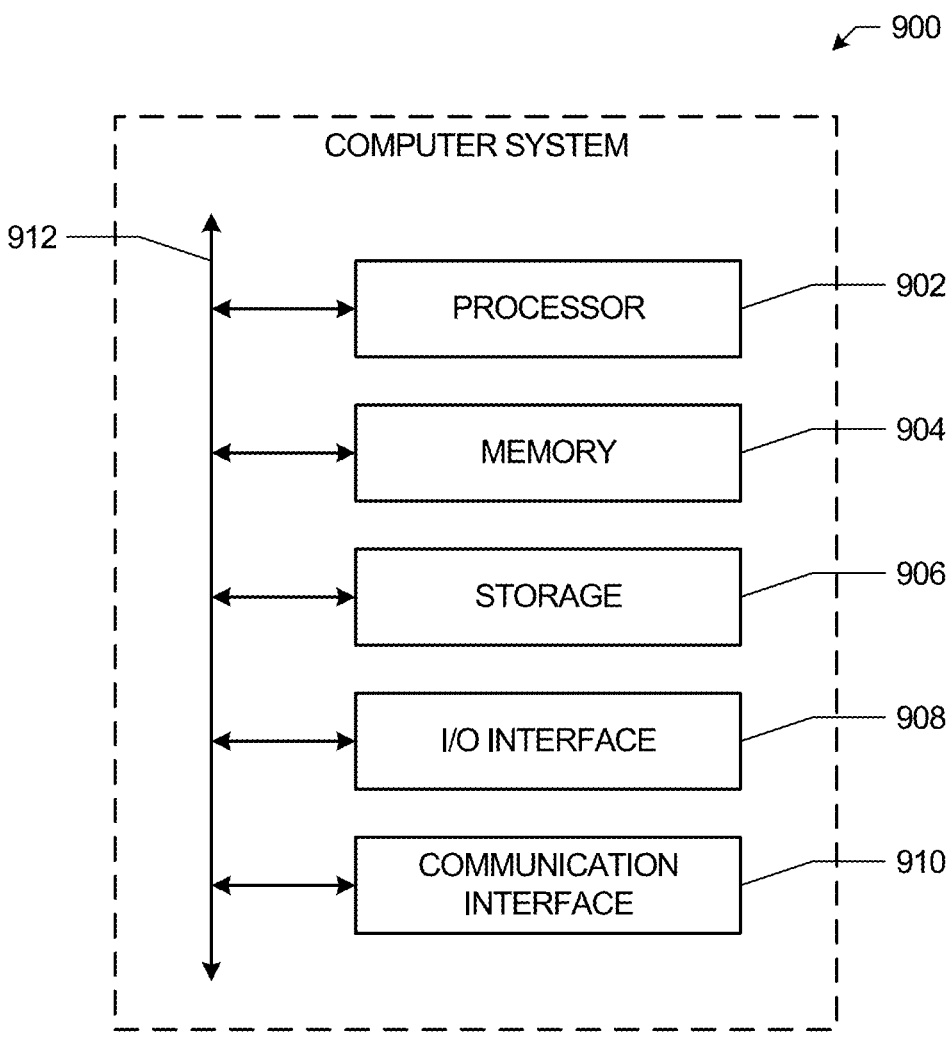
FIG. 9 illustrates an example computer system.

FIG. 9 illustrates an example computer system 900 that may be utilized for performing an action with respect to a UWB-enabled device (e.g., fare gate), generating a payment cryptogram for authorizing a payment transaction relating to the action, and authorizing the payment transaction, in accordance with the presently disclosed embodiments. In particular embodiments, one or more computer systems 900 perform one or more steps of one or more methods or processes described or illustrated herein. In particular embodiments, one or more computer systems 900 provide functionality described or illustrated herein. In particular embodiments, software running on one or more computer systems 900 performs one or more steps of one or more methods or processes described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks.

Where appropriate, one or more computer systems 900 may perform without substantial spatial or temporal limitation one or more steps of one or more methods or processes described or illustrated herein. As an example, and not by way of limitation, one or more computer systems 900 may perform in real time or in batch mode one or more steps of one or more methods or processes described or illustrated herein. One or more computer systems 900 may perform at different times or at different locations one or more steps of one or more methods or processes described or illustrated herein, where appropriate.

In particular embodiments, computer system 900 includes a processor 902, memory 904, storage 906, an input/output (I/O) interface 906, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902.

Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere).

One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 906 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 906 for them. Where appropriate, I/O interface 906 may include one or more device or software drivers enabling processor 902 to drive one or more of these I/O devices. I/O interface 906 may include one or more I/O interfaces 906, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it.

As an example, and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example, and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

detecting, via an ultra-wide band (UWB) communication protocol executing on a first UWB-enabled device, one or more UWB anchors associated with a second UWB-enabled device as the first UWB-enabled device approaches the second UWB-enabled device, wherein the UWB communication protocol enables the first UWB-enabled device to communicate with the one or more UWB anchors associated with the second UWB-enabled device via UWB signals;

determining, by the first UWB-enabled device based on the UWB signals exchanged between the first UWB-enabled device and the one or more UWB anchors associated with the second UWB-enabled device, spatial and directional information indicating a location and a direction of the first UWB-enabled device with respect to the second UWB-enabled device, respectively;

sending, via the ultra-wide band (UWB) communication protocol from a first application associated with the first UWB-enabled device to a second application associated with the second UWB-enabled device, (1) the spatial and directional information indicating the location and the direction of the first UWB-enabled device with respect to the second UWB-enabled device and (2)

balance information indicating an available monetary balance on the first UWB-enabled device, wherein the second application associated with the second UWB-enabled device uses the spatial and directional information and the balance information to automatically perform a contactless action with respect to the second UWB-enabled device;

receiving, by the first application associated with the first UWB-enabled device from the second application associated with the second UWB-enabled device, event information relating to the contactless action performed with respect to the second UWB-enabled device;

determining, by the first application associated with the first UWB-enabled device, unique device characteristics associated with the first UWB-enabled device;

generating, by the first application associated with the first UWB-enabled device in cooperation with an electronic wallet stored on the first UWB-enabled device, a payment cryptogram based on the event information and the unique device characteristics, wherein the payment cryptogram is used for securely authorizing a payment transaction relating to the contactless action performed with respect to the second UWB-enabled device; and sending, by the first application associated with the first UWB-enabled device, a payment authorization request comprising the payment cryptogram to a payment platform associated with the second UWB-enabled device for authorizing the payment transaction.

2. The method of claim 1, wherein:

the first UWB-enabled device is a mobile electronic device; and the second UWB-enabled device is a fare gate located at a transit station or terminal, wherein the one or more UWB anchors are installed on the fare gate that enables the fare gate to be the second UWB-enabled device.

3. The method of claim 2, wherein the contactless action performed with respect to the second UWB-enabled device comprises automatically opening the fare gate for a user associated with the first UWB-enabled device to pass through without requiring an explicit input from the user.

4. The method of claim 2, wherein the event information comprises one or more of:

a station identifier identifying the transit station at which the fare gate is located;

a fare gate identifier identifying the fare gate at which the contactless action is performed; or a time stamp indicating a time at which the contactless action is performed.

5. The method of claim 2, wherein the unique device characteristics comprises one or more of:

a unique device name associated with the mobile electronic device;

a unique serial number or identifier associated with the mobile electronic device; or an international mobile equipment identity (IMEI) number associated with the mobile electronic device.

6. The method of claim 1, further comprising:

receiving, by the first application associated with the first UWB-enabled device from the payment platform associated with the second UWB-enabled device, a payment authorization response, wherein the payment authorization response comprises an indication of whether the payment transaction is approved or declined; and sending, by the first application associated with the first UWB-enabled device to the second application associated with the second UWB-enabled device, the payment authorization response, wherein the second application modifies the contactless action with respect to the second UWB-enabled device based on the payment authorization response.

7. The method of claim 1, further comprising:

generating, by the first application associated with the first UWB-enabled device, a payment authorization message based on the event information and the unique device characteristics; wherein the payment authorization request further comprises the payment authorization message.

8. The method of claim 1, wherein generating the payment cryptogram comprises:

concatenating the event information and the unique device characteristics;

applying a hash function to the concatenated result; and encrypting the hashed concatenated result using a unique cryptographic or payment key provided by a payment network for a payment mechanism with which the payment transaction is made, wherein authorizing the payment transaction comprises verifying the encrypted cryptogram using the unique payment key provided by the payment network.

9. A first ultra-wide band (UWB) enabled device comprising:

one or more non-transitory computer-readable storage media including instructions; and one or more processors coupled to the storage media, the one or more processors configured to execute the instructions to:

detect, via an ultra-wide band (UWB) communication protocol executing on the first UWB-enabled device, one or more UWB anchors associated with a second UWB-enabled device as the first UWB-enabled device approaches the second UWB-enabled device, wherein the UWB communication protocol enables the first UWB-enabled device to communicate with the one or more UWB anchors associated with the second UWB-enabled device via UWB signals;

determine, by the first UWB-enabled device based on the UWB signals exchanged between the first UWB-enabled device and the one or more UWB anchors associated with the second UWB-enabled device, spatial and directional information indicating a location and a direction of the first UWB-enabled device with respect to the second UWB-enabled device, respectively;

send, via the UWB communication protocol from the first UWB-enabled device to the second UWB-enabled device, (1) the spatial and directional information indicating the location and the direction of the first UWB-enabled device with respect to the second UWB-enabled device and (2) balance information indicating an available monetary balance on the first UWB-enabled device, wherein the spatial and directional information and the balance information are used to perform a contactless action for the first UWB-enabled device with respect to the second UWB-enabled device;

receive, by the first UWB-enabled device from the second UWB-enabled device, event information relating to the contactless action performed with respect to the second UWB-enabled device;

determine, by the first UWB-enabled device, unique device characteristics associated with the first UWB-enabled device;

generate, by the first UWB-enabled device in cooperation with an electronic wallet stored on the first UWB-enabled device, a payment cryptogram based on the event information and the unique device characteristics, wherein the payment cryptogram is used for securely authorizing a payment transaction relating to the contactless action performed with respect to the second UWB-enabled device; and send, by the first UWB-enabled device, a payment authorization request comprising the payment cryptogram to a payment platform associated with the second UWB-enabled device for authorizing the payment transaction.

10. The first UWB-enabled device of claim 9, wherein: the first UWB-enabled device is a mobile electronic device.

11. The first UWB-enabled device of claim 9, wherein the contactless action comprises automatically opening a fare gate for a user associated with the first UWB-enabled device to pass through without requiring an explicit input from the user.

12. The first UWB-enabled device of claim 10, wherein the event information comprises at least a time stamp indicating a time at which the contactless action is performed.

13. The first UWB-enabled device of claim 10, wherein the unique device characteristics comprises one or more of:

a unique device name associated with the mobile electronic device;

a unique serial number or identifier associated with the mobile electronic device; or an international mobile equipment identity (IMEI) number associated with the mobile electronic device.

14. The first UWB-enabled device of claim 9, wherein the one or more processors are configured to execute the instructions to:

receive, by the first UWB-enabled device from the payment platform associated with the second UWB-enabled device, a payment authorization response, wherein the payment authorization response comprises an indication of whether the payment transaction is approved or declined; and send, by the first UWB-enabled device to the second UWB-enabled device, the payment authorization response, wherein the contactless action is modified based on the payment authorization response.

15. A non-transitory computer-readable medium comprising instructions that, when executed by one or more processors of a first ultra-wide band (UWB) enabled device, cause the one or more processors to:

detect, via an ultra-wide band (UWB) communication protocol executing on the first UWB-enabled device, one or more UWB anchors associated with a second UWB-enabled device as the first UWB-enabled device approaches the second UWB-enabled device, wherein the UWB communication protocol enables the first UWB-enabled device to communicate with the one or more UWB anchors associated with the second UWB-enabled device via UWB signals;

determine, by the first UWB-enabled device based on the UWB signals exchanged between the first UWB-enabled device and the one or more UWB anchors associated with the second UWB-enabled device, spatial and directional information indicating a location and a direction of the first UWB-enabled device with respect to the second UWB-enabled device, respectively;

send, via the UWB communication protocol from the first UWB-enabled device to the second UWB-enabled device, (1) the spatial and directional information indicating the location and the direction of the first UWB-enabled device with respect to the second UWB-enabled device and (2) balance information indicating an available monetary balance on the first UWB-enabled device, wherein the spatial and directional information and the balance information are used to perform a contactless action for the first UWB-enabled device with respect to the second UWB-enabled device;

receive, by the first UWB-enabled device from the second UWB-enabled device, event information relating to the contactless action performed with respect to the second UWB-enabled device;

determine, by the first UWB-enabled device, unique device characteristics associated with the first UWB-enabled device;

generate, by the first UWB-enabled device in cooperation with an electronic wallet stored on the first UWB-enabled device, a payment cryptogram based on the event information and the unique device characteristics, wherein the payment cryptogram is used for securely authorizing a payment transaction relating to the contactless action performed with respect to the second UWB-enabled device; and send, by the first UWB-enabled device, a payment authorization request comprising the payment cryptogram to a payment platform associated with the second UWB-enabled device for authorizing the payment transaction.

16. The non-transitory computer-readable medium of claim 15, wherein:

the first UWB-enabled device is a mobile electronic device.

17. The non-transitory computer-readable medium of claim 15, wherein the contactless action comprises automatically opening a fare gate for a user associated with the first UWB-enabled device to pass through without requiring an explicit input from the user.

18. The non-transitory computer-readable medium of claim 16, wherein the event information comprises at least a time stamp indicating a time at which the contactless action is performed.

19. The non-transitory computer-readable medium of claim 16, wherein the unique device characteristics comprises one or more of:

a unique device name associated with the mobile electronic device;

a unique serial number or identifier associated with the mobile electronic device; or an international mobile equipment identity (IMEI) number associated with the mobile electronic device.

20. The non-transitory computer-readable medium of claim 15, wherein the instructions that, when executed by the one or more processors of the first UWB-enabled device, cause the one or more processors to:

receive, by the first UWB-enabled device from the payment platform associated with the second UWB-enabled device, a payment authorization response, wherein the payment authorization response comprises an indication of whether the payment transaction is approved or declined; and send, by the first UWB-enabled device to the second UWB-enabled device, the payment authorization response, wherein the contactless action is modified based on the payment authorization response.

\* \* \* \* \*